United States Patent
Willart et al.

(10) Patent No.: US 9,804,254 B2
(45) Date of Patent: Oct. 31, 2017

(54) METHOD FOR DETERMINING THE TIMING OF THE RECEIPT OF A RADIO MESSAGE

(71) Applicant: TRUE HEADING AB, Danderyd (SE)

(72) Inventors: Nils Willart, Tyresö (SE); Bengt Johansson, Göteborg (SE); Anders Bergström, Djursholm (SE)

(73) Assignee: TRUE HEADING AB, Danderyd (SE)

( * ) Notice: Subject to any disclaimer, the term of this patent is extended or adjusted under 35 U.S.C. 154(b) by 0 days.

(21) Appl. No.: 15/026,997

(22) PCT Filed: Sep. 26, 2014

(86) PCT No.: PCT/SE2014/051115
§ 371 (c)(1),
(2) Date: Apr. 4, 2016

(87) PCT Pub. No.: WO2015/050492
PCT Pub. Date: Apr. 9, 2015

(65) Prior Publication Data
US 2016/0259031 A1    Sep. 8, 2016

(30) Foreign Application Priority Data

Oct. 4, 2013  (SE) ...................... 1351172

(51) Int. Cl.
*H04L 27/00*        (2006.01)
*G01S 5/02*         (2010.01)
(Continued)

(52) U.S. Cl.
CPC .............. *G01S 5/0221* (2013.01); *G01S 5/14* (2013.01); *G01S 11/08* (2013.01); *G08G 3/02* (2013.01);
(Continued)

(58) Field of Classification Search
CPC .. H04B 7/18513; H04B 7/18515; H04B 7/26; H04B 7/1851; G01S 5/0027;
(Continued)

(56) References Cited

U.S. PATENT DOCUMENTS

| 6,317,602 | B1 | 11/2001 | Wasby |
| 8,300,610 | B2 * | 10/2012 | Tsudaka ................... G04G 7/02 370/336 |

(Continued)

FOREIGN PATENT DOCUMENTS

| AU | 2013200747 A1 | 3/2013 |
| CN | 100388639 C | 2/2006 |

(Continued)

OTHER PUBLICATIONS

Recommendation ITU-R M.1371-4, Technical Characteristics for an Automatic Identification System Using Time-Division Multiple Access in the VHF Maritime Mobile Band, International Telecommunication Union, Apr. 2010.

(Continued)

*Primary Examiner* — Rahel Guarino
(74) *Attorney, Agent, or Firm* — Tucker Ellis LLP

(57) ABSTRACT

A method for determining the time of receipt by a radio receiver of a binary coded radio message emitted by a sender. A radio signal containing the message is received by the receiver. An analog electrical signal is generated, sampled and optionally demodulated. The data content of the message is determined based upon the demodulated signal as a stream of data bits. The stream of data bits comprises a predetermined signal element whose time of receipt is determined. A digitally stored, constructed comparison signal is created based upon the stream of data bits. The constructed comparison signal is constructed to correspond to the sampled signal, in that a time variable which (Continued)

maximizes a correlation between the constructed comparison signal and the sampled signal is determined, and in that the time variable is then used to correct the time determination of the receipt of the predetermined signal element.

15 Claims, 6 Drawing Sheets

(51) Int. Cl.
*G01S 5/14* (2006.01)
*G01S 11/08* (2006.01)
*G08G 3/02* (2006.01)
*H04B 1/59* (2006.01)
*H04L 27/06* (2006.01)
*H04L 29/06* (2006.01)
*H04W 4/02* (2009.01)

(52) U.S. Cl.
CPC ............ *H04B 1/59* (2013.01); *H04L 27/06* (2013.01); *H04L 29/06* (2013.01); *H04W 4/025* (2013.01)

(58) Field of Classification Search
CPC .... G01S 13/9307; G01S 7/4008; G01S 11/08; G01S 19/35; G01S 7/10; G01S 7/12; H04L 27/2017; H04L 27/06; H04L 29/06; H04L 63/126; G01C 21/005; H01Q 1/34; H01Q 3/00
USPC ...... 375/150, 259, 324, 343; 340/7.22, 7.52, 340/991; 370/312, 392; 455/412.1
See application file for complete search history.

(56) References Cited

U.S. PATENT DOCUMENTS

| | | | |
|---|---|---|---|
| 8,665,997 | B1 | 3/2014 | Smith |
| 2003/0115027 | A1 | 6/2003 | Fernandez-Corbaton |
| 2004/0176029 | A1 | 9/2004 | Soliman |
| 2007/0276616 | A1 | 11/2007 | Wilcox |
| 2009/0121940 | A1 | 5/2009 | Ladd |
| 2009/0161797 | A1* | 6/2009 | Cowles .............. H04B 7/18513 375/324 |
| 2011/0268229 | A1 | 11/2011 | Peach |

FOREIGN PATENT DOCUMENTS

| | | |
|---|---|---|
| EP | 1089452 A1 | 4/2001 |
| EP | 2602940 A1 | 6/2013 |
| WO | 03/001699 A1 | 1/2003 |
| WO | 2008148188 A1 | 12/2008 |

OTHER PUBLICATIONS

International Search Report from counterpart International Patent Application No. PCT/SE2014/051115, dated Jan. 21, 2015.
Supplementary European Search Report from corresponding European Patent Application No. EP 14 85 0762, dated Oct. 6, 2016.
International Preliminary Report on Patentability from counterpart International Patent Application No. PCT/SE2014/051115, dated Apr. 14, 2016.

* cited by examiner

METHOD FOR DETERMINING THE TIMING OF THE RECEIPT OF A RADIO MESSAGE

FIELD OF THE INVENTION

The present invention relates to a method for determining the time of receipt of a radio message, especially an AIS (Automatic Identification System) signal sent from a transmitter to a receiver located in proximity to the transmitter. Furthermore, the invention relates to a receiver, especially an AIS receiver, for receiving such a signal.

BACKGROUND OF THE INVENTION

For example, in the shipping and aviation fields, the standardized communication system AIS is widely used for local communication between, for instance, moving vessels or between moving vessels and fixed installations, such as a port or a lighthouse. See for example "Recommendation ITU-R M.1371-4", published in 2010 by the International Telecommunication Union.

According to this system, a set of digitally coded, pre-defined messages of different types can be used by, for example, a vessel for, among other things, informing about its current position and speed to recipients located in the local geographical neighbourhood of the vessel in question. The system is self-organizing in the sense that the participating transmitters divide their respective transmission over a predetermined periodically repeated time window of certain length, so that each transmitter uses a particular part of the time window for transmission.

AIS systems often have low security, in the sense that it is difficult to verify if the contents of the data being sent, such as the position of the transmitter, is accurate and consistent with the real situation. This means that transmitters wishing to participate are expected to follow the AIS standard and to transmit accurate information, and that only simple steps to verify the security in the received information are built into the system. For example, too large timing errors for transmitted signals are not allowed.

It would be desirable to provide an improved control ability of a receiver with respect to the information transmitted by a vessel, such as the vessel position, speed and heading. It would also be desirable to be able to detect whether a particular AIS signal is emitted by one and the same transmitter.

It is known to use directional antennas for measuring the direction to a radio transmitter, in order to thus verify the transmitter position. This is however costly and gives relatively poor precision.

It would be further desirable to provide a simple way for a vessel, whose local clock falls out of sync with the other transmitting vessels, to re-synchronize its local clock. Specifically, it would be desirable to provide a so-called secondary synchronization, which can be used as an alternative to the AIS standard supported synchronization process when the latter for some reason is not available.

It would also be desirable to provide a way for two or more transmitters/receivers to be able to jointly agree on a specific time definition, which is secret among the transmitter/receiver, without any other recipients also receiving information regarding such information.

These objectives should preferably be met using existing AIS standard equipment, in a cost-effective manner and with only a minimum of necessary modifications to existing AIS equipment.

The present invention solves the above described problems.

BRIEF SUMMARY OF THE INVENTION

Thus, the invention relates to a method for determining the time of receipt by a radio receiver of a binary coded AIS message, sent by a transmitter in the form of a first signal which is a modulated radio signal, whereby the first signal is received by the receiver using an antenna so that a second signal in the form of an analogue electrical signal is achieved, which second signal is sampled and optionally demodulated, which sampling and demodulation can be performed in any order, which sampling is performed using an AD converter, so that a digitally stored third signal in the form of a sampled and optionally demodulated signal is achieved, wherein the data content of the message is determined from the third signal as a stream of data bits, which stream of data bits comprises a predetermined signal element whose time of receipt is determined, and wherein the time of receipt of the message is determined based on the timing of the predetermined signal element, which method is characterised in that a digitally stored, constructed comparison signal is generated on the basis of said stream of data bits, so that the constructed comparison signal is constructed to correspond to the third signal, in that an optimum value is determined for a time variable, which time variable indicates a time position of the constructed comparison signal relative to the third signal and for which optimum value a correlation between the constructed comparison signal and the third signal is maximal, and in that the optimum value of the time variable is used to correct the determination of the time of receipt of the predetermined signal element. Moreover, the invention relates to a receiving device arranged to receive a binary coded AIS message, sent by a transmitter in the form of a first signal which is a modulated radio signal, which receiving device comprises an antenna arranged to receive the first signal and thereby to achieve a second signal in the form of an analogue electrical signal, an AD converter and an optional demodulation device, which AD converter and optional demodulation device are arranged to sample and possibly demodulate the said analogue signal, which sampling and demodulation can be performed in any order, and thereby to achieve a digitally stored third signal in the form of a sampled and optionally demodulated signal, which receiving device furthermore comprises a decoding device, arranged to decode the third signal and thereby to achieve the data content of the message as a stream of data bits, which stream of data bits comprises a predetermined signal element whose time of receipt is determined, and wherein the receiving device is arranged to determine the time of receipt of the message based on the timing of the predetermined signal element, which receiving device is characterised in that the receiving device comprises a timing determination device arranged to determine the time of receipt of the predetermined signal element, in that the timing determination device is arranged to generate a digitally stored, constructed comparison signal on the basis of said stream of data bits, so that the constructed comparison signal is constructed to correspond to the third signal, in that the timing determination device is arranged to determine an optimum value for a time variable, which time variable indicates a time position of the constructed comparison signal relative to the third signal and for which optimum value a correlation between the constructed comparison signal and the third signal is maximal, and in that the timing determination device is arranged to correct the said time determination of the receipt of the predetermined signal element using the optimum value of the time variable.

In the following, the invention will be described in detail, with reference to exemplary embodiments of the invention and to the accompanying drawings, in which:

DETAILED DESCRIPTION OF THE INVENTION

AIS is an example of a time-distributed messaging system, under which standardized binary coded radio messages can be sent directly between geographically proximate connected units, without the need for a common central unit via which messages need to be sent. The system is based on AIS-connected transmitters periodically or aperiodically emitting different types of standardized messages, and on that the different transmitters comprised in the system themselves distribute the available bandwidth of each transmission time period between them.

Figure 3:
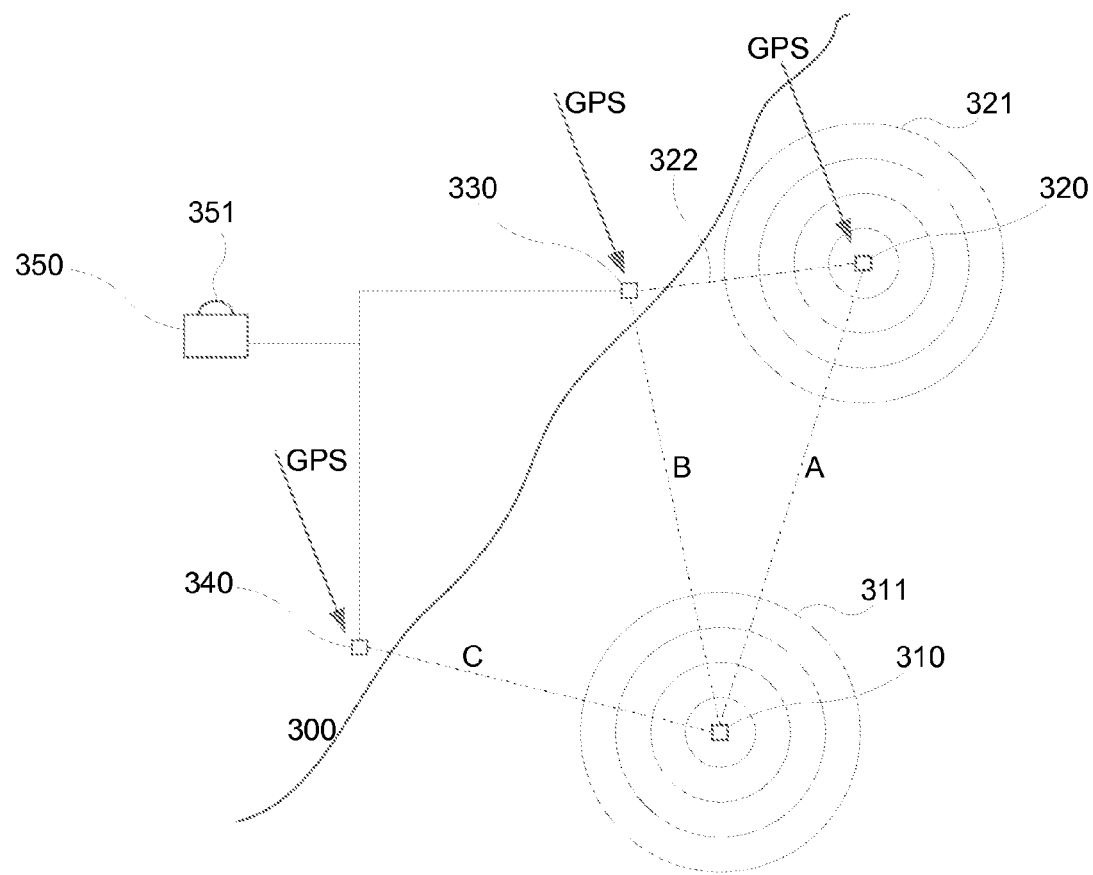
FIG. 3 is an overview diagram illustrating a system according to the invention which can be used in a method according to a first embodiment of the invention.

FIG. 3 shows two pieces of equipment 330, 340, permanently installed on land, for receiving and possibly transmitting AIS messages, as well as moving vessels in the form of boats 310, 320 arranged off a shore 300, on the water, which vessels comprise respective equipment for transmitting and receiving AIS messages. AIS messages in the form of radio signals 311, 321 are illustrated schematically.

As is shown in FIG. 3, at least AIS transmitters 310 and 320 transmit to all AIS receivers that are within the receipt range of the respective AIS transmitter in question. Although all connected devices 310, 320, 330, 340 are not necessarily of the same standardized type, they will, when brought together geographically, establish a self-organizing communication network between them based on time division over a certain transmission period. How this works falls within the AIS standard and is conventional as such.

It is understood that the fixed and mobile units 310, 320, 330, 340 illustrated in FIG. 3 may equally well be other types of fixed devices, such as a permanently installed transponder at an airport, and other types of moving vessels, such as aircraft or wheeled vehicles.

Different types of AIS messages are intended to use for different types of information, examples comprising information regarding the current position, speed, yaw rate, destination, draught and so on, for the connected device. Different types of AIS messages are transmitted according to the AIS standard at different intervals and using different power, depending inter alia on the type of transmitter.

These and other aspects of the AIS system are controlled, among others, in the recommendation ITU-R M-1371 (above). More information is also present in the documentation provided by the International Maritime Organization (IMO).

Figure 1:
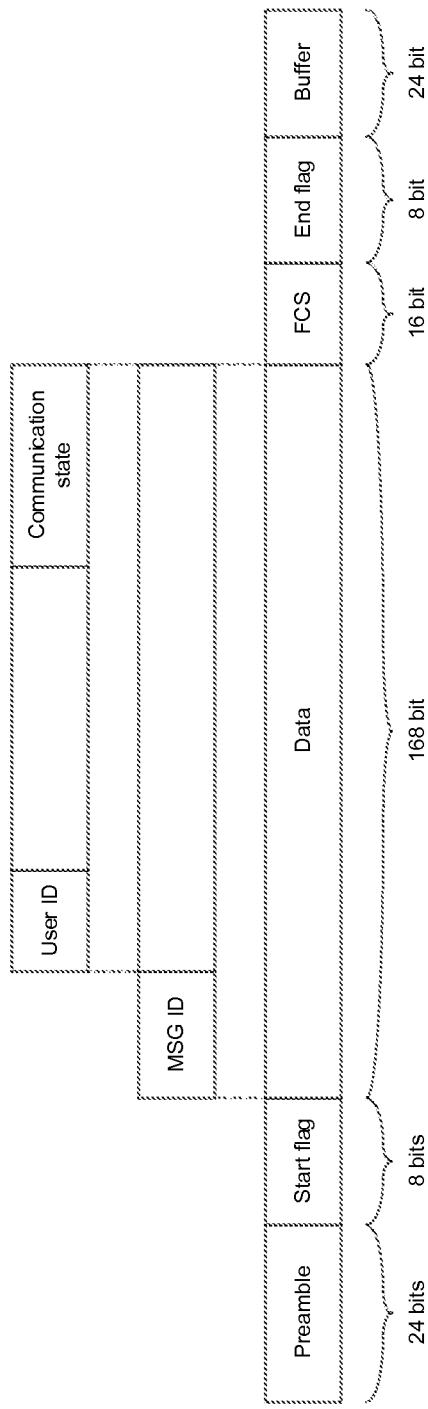
FIG. 1 shows the structure of a general AIS message.

FIG. 1 illustrates the general data structure for an AIS message, comprising the following binary coded fields. A "bit" is a "one" or a "zero".

Preamble: an initial sequence of 24 bits. May, for instance, be alternatingly "0" and "1", but with at least one trailing "0".

Start flag and End flag: both comprise 8 bits and serve as delimiters for the AIS message. May for instance be 8 bits that are all "1".

Data: 168 bits, apart from the information to be transmitted comprising the message identifier MSG ID, the sender identifier User ID and the field Communication state.

FCS: a 16 bit checksum calculated based upon the contents of the field Data, and the purpose of which is to be able to verify the integrity of the AIS message contents.

Buffer: 24 bits that may be used in predefined ways in order to communicate information about, for instance, sender distance and signal quality.

Thus, of the total length of 256 bits, a certain part of the field Data is used for the actual transfer of parameter values, while some initial fields, such as Preamble and Start Flag, comprise previously determined information.

Figure 4:
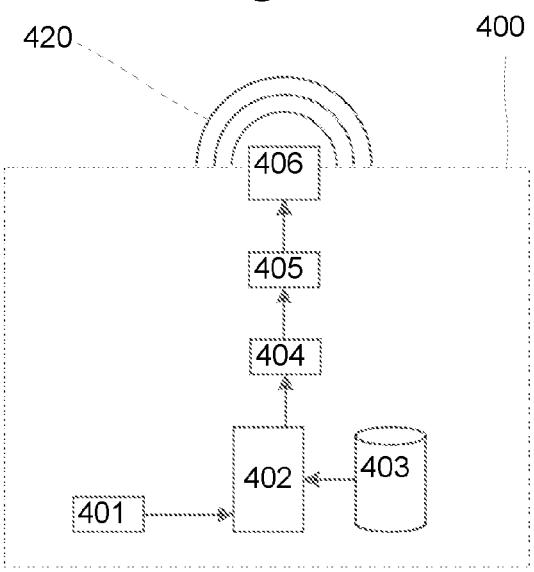
FIG. 4 illustrates the transmitter functionality of an AIS equipment according to the invention.

FIG. 4 illustrates the functional structure concerning transmission of an AIS device 400 according to a preferred embodiment, comprising means for assembling and periodically transmitting AIS messages of at least one predetermined type, which AIS messages are readable by a receiving device for AIS messages. It is preferable that the transmitting device 400 follows the specifications of a particular AIS type (such as "Class A", "Class B", base stations, AtoN (Aids to Navigation), SART (Search and Rescue Transmitter), and so on), and as such is capable of sending a certain set of different AIS message types at certain intervals.

The device 400 comprises a sensor 401, arranged to detect that an AIS message of the certain predetermined type, or possibly other types, is to be sent, such as based upon the time frame allotted to the transmission device 400 in the distributed system, or based upon CSTDMA.

Further, the transmitting device 400 comprises a digital message assembly means 402, arranged to assemble, digitally store and calculate a checksum for an AIS message of said predetermined, and any other, types. The message assembly means 402 receives the information to be transmitted in the AIS message inter alia, or at least, from a data source 403, which can contain information such as geographic position, transmitter identity and so on.

Figure 2:
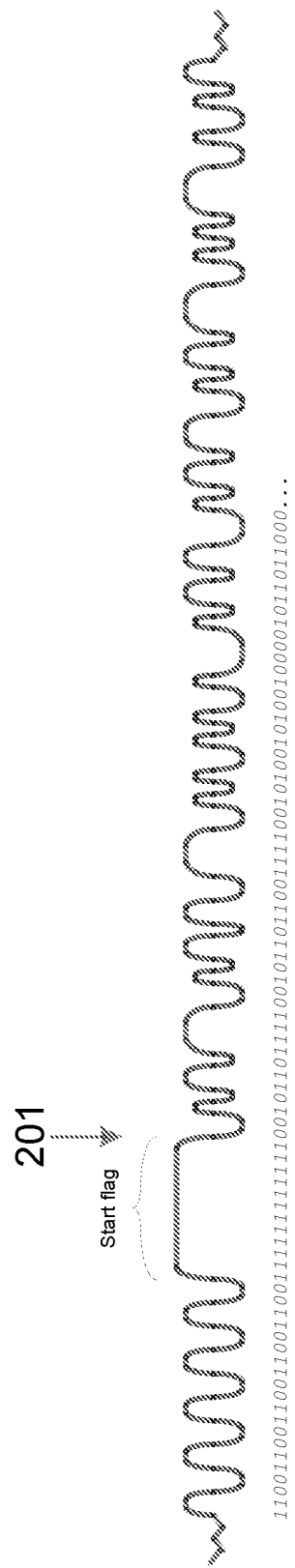
FIG. 2 shows a graph representing a gauss filtered, digitally encoded, exemplifying AIS message.

An example of the message produced and stored by the message assembly means 402 is illustrated in FIG. 2, as the sequence of binary "ones" and "zeroes" shown at the bottom of the figure. In FIG. 2, the message is abbreviated for reasons of clarity.

In a preferred embodiment, the transmitting device 400 further comprises a filtering means 404, arranged to produce a filtered signal based on said digitally stored binary signal. One example of such a filtered signal is shown in FIG. 2, as the upper curve. The binary "ones" and "zeroes" are shown in FIG. 2 next to the filtered signal, and it is clear from FIG. 2 that a binary "one" corresponds to a higher signal value in the curve, and vice versa for a binary "zero", which corresponds to a lower signal value in the curve. As illustrated in FIG. 2, the message does not follow the format regarding the number of bits in different fields illustrated in FIG. 1.

As is clear from FIG. 2, the filtered curve is not a pure step function, but a filtered version of a step function corresponding to the number sequence shown below the curve in the figure. This filtering causes the characteristic appearance of the curve. Examples of preferred filters comprise filtering using a gauss filter, as in conventional GMSK modulation (Gaussian Minimum Shift Keying). It is preferred that the obtained filtered curve is analogue, whereby the filter preferably can be an analogue filter, but it may also be digitally encoded, in which case the filter is digital.

The filtered curve is fed to a modulating device 405, which modulates, preferably frequency modulates, the filtered signal on a carrier wave, which is then amplified and fed to an antenna 406, which in turn transmits the AIS signal as a radio signal 420.

It is preferred that all steps 401-406 constitute software or hardware implemented parts, respectively, of one and the same computer equipment, which in that case comprises or constitutes the device 400.

Figure 5B:
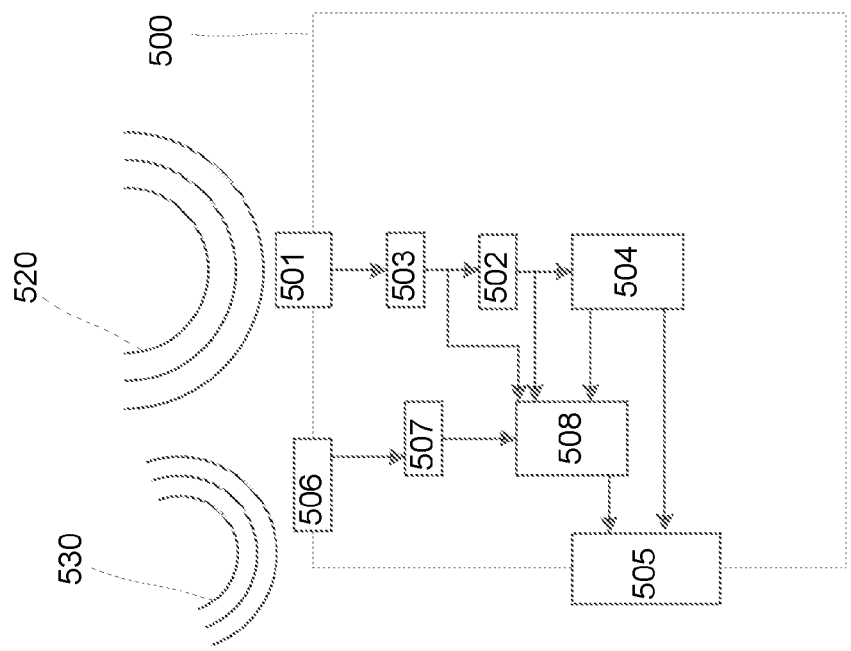
FIGS. 5a and 5b illustrate two different variants of the receiver functionality in an AIS equipment according to the invention.
Figure 5A:
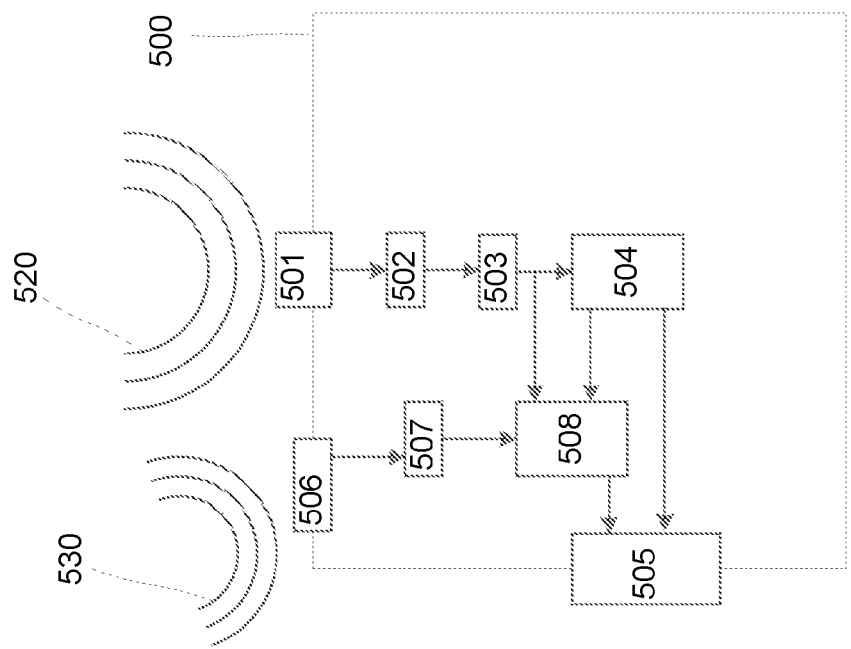

FIG. 5a schematically illustrates the receiving functionality of an AIS device 500 according to the present invention, arranged to determine the time of receipt by the AIS device 500 of an AIS message sent by a transmitter similar to the one described above. An antenna 501 is arranged to receive an incoming radio signal 520 encoding an AIS message, so that an analogue electrical signal is achieved. The radio signal, which is a modulated radio signal, is composed of a carrier wave on which a data signal is modulated, preferably frequency modulated. The radio signal is a first signal of the present invention.

The received analogue signal constitutes a second signal of the present invention. This second signal is sampled, and possibly also demodulated. The thus produced, sampled and optionally demodulated signal constitutes a third signal of the invention. In case the signal is both sampled and demodulated, the sampling and demodulation may be performed in any order, see below.

According to the present exemplifying embodiment, the second signal is demodulated and sampled, which sampling is performed using an AD converter 503, so that a digitally stored, sampled and demodulated signal is achieved, corresponding to the demodulated analogue signal. The AD converter 503 has a sampling frequency of at least 10 kHz, preferably at least 100 kHz. Alternatively, the sampling frequency is at least 10 times as high as the bit rate per second of the received signal, which bit rate in the case of an AIS message is 9600 Hz.

FIG. 5a shows a demodulation device 502, which is arranged to accept said analogue, electrical signal and to demodulate this signal so that a demodulated, analogue signal is achieved, and is fed to the AD converter 503. This demodulated analogue signal resembles the upper curve in FIG. 2 as regards its appearance, but also comprises some components in the form of noise and any additional filtering effects from the transmitter as well as the receiver.

FIG. 5b is identical to FIG. 5a, but illustrating an alternative configuration, wherein the AD converter 503 is arranged to sample the incoming frequency modulated, analogue signal from the antenna 501, so that a digital version of this signal is achieved, and wherein the demodulating device 502 is digital, and performs demodulation in the digital domain.

It is also understood that in case the second signal is sampled directly, either a digital demodulation can be performed, alternatively the information can be directly extracted from the sampled signal without any particular demodulation.

The demodulated digital signal is then fed to a decoding device 504, arranged to determine the AIS message data content based on the demodulated signal, as a stream of data bits similar to the lower number sequence in FIG. 2. This decoding is done in an, as such, conventional manner. The decoding device 504 is preferably an AIS standard modem, which modem may also comprise, for example, the demodulating device 502.

The decoding device 504 is arranged to, after decoding, make the received message available via an interface 505, such as a graphic display or a digital communication interface for the publication of the message for reading of external software modules.

According to the invention, a predetermined signal element has been defined beforehand which it is known that said stream of data bits comprises. Preferred examples of such predetermined signal elements are the front edge or the trailing edge of the field "Start flag", illustrated in FIG. 1 and in FIG. 2. For example, at the front edge, it may be known in advance that one "zero" is followed by a series of eight "ones". At the trailing flank, it may be known in advance that a series of eight "ones" is followed by one "zero". A signal element of the latter type is indicated by an arrow 201 in FIG. 2. It is preferred that the predetermined signal element in a corresponding way is constituted by a predetermined position in a number of bits of the AIS message whose data content is known in advance, and which preferably comprises either a series of "zeroes" or a series of "ones" of a pre-known length, which is followed by a change from "0" to "1" or from "1" to "0". This provides a simple and unambiguously identifiable upward or downward flank in the demodulated signal. It is especially preferred, in particular in AIS applications, that the signal element is constituted by the final bit in a previously known series of bits that each is either "0" or "1", and which is followed by a switch to "1" or "0", respectively. In particular, the end of, in other words the trailing edge of, the field "Start flag" in AIS messages is useful.

According to the invention, it is the time of receipt of said signal element that is determined, and the time of receipt of the message is then determined based on the timing of the predetermined signal element by the position of the predetermined signal element in the message being known in advance.

This is accomplished by a digitally stored constructed comparison signal firstly being generated by a timing determination device 508 and on the basis of the stream of data bits, in other words the data content in the received AIS message, so that the constructed comparison signal is constructed to correspond to either the received frequency modulated signal before or, preferably, after demodulation. This comparison signal must always correspond to the sampled signal, but in case the AD converter 503 is arranged upstream of the demodulation device 502 it may be the sampled signal before or after demodulation that the comparison signal is to be constructed to correspond to. In the case in which the signal received by the antenna, before modulation by the transmitter, is filtered by a particular filter, it is preferred that the comparison signal is constructed by, in a corresponding manner, filtering a digital signal representing the data content using a filter with essentially the same properties as the said certain filter, for example a gauss filter according to the above.

As is clear from FIGS. 5a and 5b, the decoded binary data in the AIS message is fed from the decoding device 504 to the timing determination device 508. In addition, the sampled signal, or alternatively the sampled and demodulated signal, as well as interrupt signals (see below), are fed to the timing determination device 508.

In the present context, that the comparison signal is "constructed to correspond to" the received signal means that the timing determination device 508 digitally synthesizes a signal curve, by data processing of the digital contents of the received AIS message, such as in terms of binary "ones" and "zeroes", in a way that simulates or corresponds to the signal processing in the transmitter that gave rise to the sent and then received, modulated radio signal 520. In other words, the decoded binary data in the AIS message is used to simulate the sampled and optionally demodulated signal received by the timing determination device 508, using known characteristics of the transmitter regarding how the transmitter creates the transmitted radio signal.

In the example illustrated in FIGS. 4, 5a and 5b, this indicates that a gauss filtered curve of the type illustrated at the top in FIG. 2 is achieved, corresponding to the bit sequence in the AIS message analysed in the decoding device 504. Thus, in this example, the signal having been received by the antenna 501, before modulation by the transmitter, has been filtered by a particular filter which then also is applied to the constructed signal.

Thereafter, an optimum value for a time variable is determined by the timing determination device 508, which time variable specifies a position or displacement of the constructed comparison signal on the time scale relative to said sampled and possibly demodulated signal, and for which optimum value a correlation between the constructed comparison signal and the sampled signal is maximal. In the following, the sampled and optionally demodulated signal is denoted the "sampled signal", for reasons of simplicity.

Herein, the term "correlation" refers to a comparison operation performed between the two signals for individual points in time, and which is a measure of the total conformity and/or covariance of the signals as seen over a certain time interval.

In other words, the constructed comparison signal is oriented by a certain time scale displacement relative to the corresponding sampled signal, after which a correlation between the signals is calculated, and the displacement that maximizes the correlation is the optimum value for the time variable.

The correlation can for example be calculated as:

$$C_j = k \sum_{i=T_0}^{T_1} (S(i)J(i+j))$$

where
j=the said time constant
$C_j$=the correlation for time constant=j,
k=a constant,
$\{T_0, T_0\}$=the time interval in question,
S(i)=the sampled signal curve in point (i), and
J(i)=the constructed comparison signal curve in point (i).
$\{T_0, T_0\}$ may cover the whole time overlap of the signal curves, alternatively only a shorter test time interval.

It is realized that the correlation, in a corresponding manner, can be calculated over a continuous time interval, rather than for discrete time points.

Hence, the value for j which maximizes $C_j$ is calculated.

According to a preferred embodiment, the optimum value for the time variable is calculated by calculating the correlation for several values of the time variable, and then searching for the global maximum for the correlation as a function of the time variable. Numerically, this can for example be performed by first determining an initial temporal relative orientation of the two signals, which may be based on empirically derived values for delays in the receiver 500. Then, the correlation may be calculated for a number of values of the time variable shifted forwards or backwards relative to the original time orientation, so that a rough approximation of a correlation function C(j) is achieved, by means of which a coarse value for the optimum time variable can be determined. Then, the correlation may be calculated for shorter intervals of the time variable in an interval around the said rough value, in order to achieve a more accurate value for the maximum. This can be repeated several times, and finally the derivative of the correlation function can be calculated, and the maximum may be determined as the value of the time variable for which the derivative function intersects 0. This intersection may for example be calculated by means of linear interpolation. All these calculations are done in a microprocessor in the receiver 500, and on the initiative of the timing determination device 508.

Then, the thus determined optimum value for the time variable is used for correcting the determination of the time of receipt of the predetermined signal element. Information regarding the corrected timing is then published by the timing determination device 508 via the interface 505.

According to a preferred embodiment, the decoding device 504 is arranged to detect the receipt of the above discussed predetermined signal element, and at such a detection to report the receipt to the timing determination device 508. In this case, it may be a time determination of the receipt by the decoding device 504 of the predetermined signal element which is corrected by the above described time variable.

According to a further preferred embodiment, all relevant delays in the receiver are measured before the AIS message is received, comprising the delay in the demodulation device 502, the AD converter 503 and the decoding device 504. Then, those of said delays that affect such timing information which is reached by the timing determination device 508 and that relate to the receipt of the predetermined signal element, and/or those of said delays that occur before a signal indicating that the predetermined signal element has been received reaches the timing determination device 508, are used for adjusting the timing determination of the predetermined signal element in addition to the adjustment using the optimum time variable. Such delays are generally consistent, predictable, and can therefore be determined in advance. Examples comprise delays in the AD converter 503 itself.

According to one preferred embodiment, in addition to a filtering intended to simulate a filter that is applied by the transmitter before modulation, such as the above described gauss filtration, the constructed comparison signal may also be subjected to a filtration using a filter before computing the said correlations, so that deviations of the sampled signal that occur due to the previously known analogue frequency and/or phase response are simulated before sampling using said filter. Such a filter may for instance be constituted by a suitable FIR filter.

The sampled signal to be correlated with the comparison signal may be fed to the timing determination device 508 from the decoding device 504, but it is preferred that it is fed to the timing determination device 508 directly from the demodulation device 502 or the AD converter 503. What is important is that information concerning the time of receipt of the predetermined signal element is made known to the timing determination device 508.

The receiver includes a clock 507 which provides the timing determination device 508 with the current time. According to a preferred embodiment, the AD converter 503 sends out at least one interrupt signal to indicate a certain sampling time. The interrupt signal is detected, directly or via for example the decoding device 504, by the timing determination device 508, and the sending of the interrupt signal is timed by the clock 507. In this case, the above described time of receipt of the predetermined signal element is based on the time-determined emission of the said interrupt signal, by means of the sending time of the interrupt signal being compared to a certain temporal position of the sampled signal. It is preferred that the interrupt signal whose sending is related to the sampled signal is an interrupt signal which is sent when, or in connection to when, the predetermined signal element was received. As described above, various delays of the demodulating device 502, the AD converter 503, the decoding device 504 and so on, that are previously known, may be compensated for in an appropriate way in order to determine which interrupt signal is sent when the predetermined signal element was received.

According to a preferred embodiment, the AD converter 503 sends a plurality of interrupt signals at predetermined time intervals, preferably one interrupt signal for each sampling point. In this case, the sending is time-determined using several such interrupt signals consecutively sent out by the clock 507, after which each one of the points in time for the receipt of such interrupt signals is adjusted using said previously known time intervals, in order to estimate the time of sending of a certain single interrupt signal, such as the interrupt signal at which the predetermined signal element was received. The thus adjusted time determinations are then averaged, so that an averaged time of sending of the certain single interrupt signal is achieved. Finally, the determination of the time of receipt of the predetermined signal element is based on said averaged point in time of the sending of the certain single interrupt signal, by relating the certain single interrupt signal to a specific position on the time scale of the sampled signal.

For example, the interrupt signal at which the predetermined signal element was received may constitute the certain single interrupt signal, and a sequence of interrupt signals which is then detected by the timing determination device 508 may be used to calculate a more accurate value of the sending time of the certain interrupt signal as follows:

$$T_{med} = K + \frac{1}{m}\sum_{i=0}^{m-1}\left(T_{CLK}(i) - \frac{1}{F_s}\right)$$

where
$T_{med}$=the time averaged value for the receipt of the certain single interrupt signal, K=an optional adjusting time constant for taking into consideration delays in the receiver 500,
m=the total number of interrupt signals to be used for the calculation of the average value,
$T_{CLK}(i)$=the time of the clock 507 when the interrupt signal with number i from the certain interrupt signal is detected by the timing determination device 508, and
$F_s$=the sampling frequency.

m is preferably a number of samplings corresponding to at least 10 bits in the message signal, alternatively at least 100 samplings.

Such a method provides a highly accurate value for the receipt time point, and thus also the sending of a certain single interrupt signal (in this example the one when the predetermined signal element was received). Thereby, a precisely defined time reference for the sampled signal is achieved, wherein the above described time determination using the constructed signal also becomes highly accurate, in the corresponding way.

It is further preferred that the clock 507 comprises a local oscillator, which is periodically synchronized to the time information in a received GPS signal (Global Positioning System) 530, which is received through an antenna 506. The extraction of a time signal from the GPS signal 530 is conventional as such. The present inventors have discovered that if the local oscillator consists of a per se conventional crystal oscillator, which is less expensive than, say, an atomic clock, and in case the oscillator is periodically synchronized using GPS signal timing, adequate results are achieved with regard to the timing of the received AIS message. It is thus preferred not to use an atomic clock.

It is preferred that the clock oscillator 507 is periodically synchronized using the time information of the GPS signal 530, preferably at least every minute, more preferably at least every ten seconds, more preferably at least every second. It is preferred that the clock 507 is sufficiently precise to always have a sense of time that is correct to the precision of at the most 100 ns for such synchronization periods.

Using a method according to the present invention, the time of receipt of a message comprising a predetermined signal element can be determined with great accuracy. Also, the receipt of single messages can be timed precisely.

In particular, this applies to AIS messages. As an AIS receiver typically already comprises modules 501, 502, 503, 504 and 506, the timing determination device 508 may, at low cost, be added to the existing equipment, for example in the form of a software module arranged to be executed on the same computer that already executes for instance software constituting the decoding device 504. This way, the receipt of up to 2250 messages per minute may be timed within the scope of the existing AIS system and without significant investments in new hardware.

In the following, a number of applications are described in which such accurate timing can be used.

FIG. 3 illustrates a first example, in which the position of the vessel 310 is determined by triangulation between the respective times of receipt of the message signal by at least three different receivers, such as AIS receivers 320, 330, 340. The clocks in each of these receivers 320, 330, 340 have been synchronized ahead of time, to one and the same common view of the current time, preferably by means of all three being of the above described GPS-synchronized type, thereby sharing the same time reference.

All three receivers 320, 330, 340 receive the same AIS radio signal A, B, C from the transmitter 310, but at different times. Each of the receivers 320, 330, 340 measures the time of receipt of the same predetermined signal element of the received signal, and a location of the transmitter 310 is then determined by triangulation based on the respective location of the three recipients, which is known in advance, in combination with differences in the respective time of receipt of the said signal element. The triangulation calculations themselves may, for example, be performed by a central computer 350, which is connected to the receivers 320, 330, 340. Any movable participating vessels 320, such as boats, trucks or helicopters, may report their current position through an as such conventional wireless data link 322.

Using such a process, the present inventors have noted that accuracies of as little as a few hundred meters have been achieved regarding the position determination of an AIS transmitter 310 at an SNR (Signal to Noise Ratio) of 10 dB, which is sufficient to in practice be able to verify the accuracy of, for example, the reported location of the AIS transmitter 310 as reported by the transmitter 310 itself.

According to a preferred embodiment, at least one AIS message being sent by the AIS transmitter 310 is tapped, so that a stated position for the AIS transmitter can be obtained. In addition, AIS information that allows the time of sending of a specific future AIS message to be predicted is preferably tapped, for instance using information about where in the AIS time window a specific AIS message is periodically sent from the AIS transmitter 310 during normal operation. Then the receipt of the certain future AIS message from the AIS transmitter 310 in question is tapped and timed, and the position of the AIS transmitter 310 is triangulated as described above, based on the receipt of the certain AIS message in question.

Thereafter, the calculated position of the AIS transmitter 310, and/or a heading and/or a velocity, as calculated based on several successive calculations performed by the location of the AIS transmitter 310, may be compared with a position and/or a heading and/or a velocity of AIS transmitter 310 as stated in an AIS message sent by the AIS transmitter 310. In the case in which locations and/or headings and/or velocities are pairwise different by more than a respective predetermined value, an alarm signal is emitted via an alarm device 351, which in FIG. 3 is illustrated symbolically.

Figure 6:
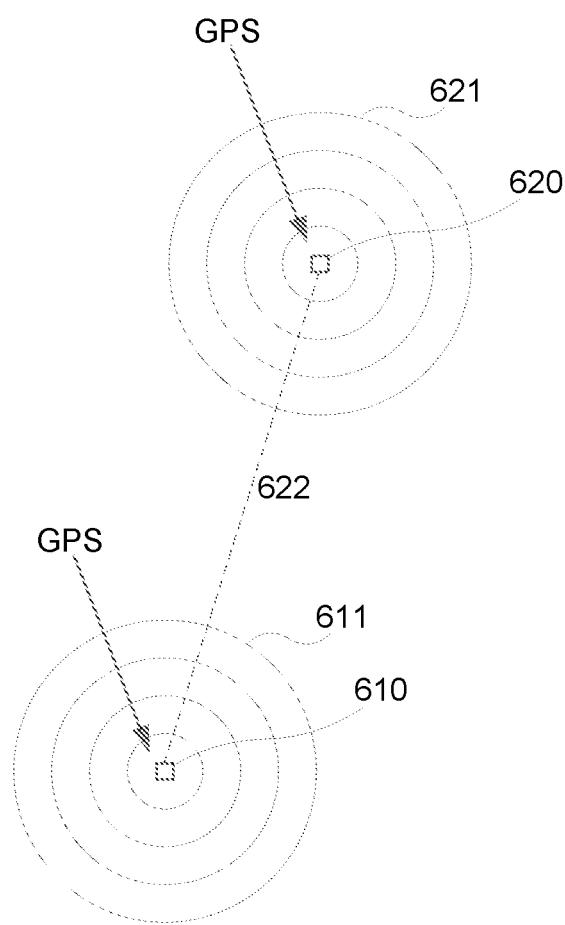
FIG. 6 is an overview diagram illustrating a system according to the invention which can be used in a method according to a second embodiment of the invention.

FIG. 6 illustrates a further example of an application of the method described above for precise timing of an AIS message, with at least two transmitter/receiver apparatuses 610, 620, such as AIS equipment that can be installed on fixed and/or movable objects, both including a respective GPS synchronized clock according to the above, and both being able to send out radio signals 611, 621, such as AIS messages. In this case, the position of a transmitter 610 relative to a receiver 620 is known in advance by the receiver 620, whereby the transmitter 610 transmits a radio message including a predetermined signal element, such as an AIS message, to the receiver 620. Thereby, the receiver 620 can determine the timing of the receipt of the transmitted signal with high accuracy, using a method according to the invention. After correcting for the signal delay between the transmitter 610 and the receiver 620, based on said known relative distances, a precise timing of the transmitter's 610 sending of the message is achieved by the receiver 620. Thus, a common point in time can be synchronized between the transmitter 610 and receiver 620, based upon the commonly known timing of the sending by the transmitter 610 of the message signal.

Such a time synchronization between two devices 610, 620 can be used, for instance, to agree on a common secret sense of time, without any other nearby devices being able to gain knowledge about such a sense of time. The sense of time can for example be used to agree ahead of time on the timing of a change of carrier frequency for secret information, or the like.

In both of the applications described in connection with FIGS. 3 and 6, there are additional benefits of adding another layer of authentication based on a fingerprint regarding the transmitter 310, 610.

For example, in FIG. 3, the verification of the position, speed and/or heading of the transmitter 310 may be combined with a verification of such fingerprint, so that the combined verification becomes very safe. For example, the fingerprint of one AIS message may be compared with that of a later sent AIS message, and verification can be done by examining whether or not the fingerprints are identical. Alternatively, a detected fingerprint may be compared to a previously known fingerprint, based on current knowledge of the type of AIS transmitter equipment or the like. Moreover, it can be verified that the same radio signal is accessed by all three receivers 320, 330, 340.

In FIG. 6, a verification of a previously known fingerprint of the transmitter 610 is used to ensure that the transmitter 610 really is the expected one.

Herein, a "fingerprint" refers to a characteristic of the radio signal depending on the characteristics of the transmitter itself, such as a previously known deviation from an ideal signal depending on signal processing in the transmitter. Examples include predictable variations in timing inaccuracies over an AIS period, characteristic pulse shapes at ramp-ups or ramp-downs and the resulting GMSK signature of the sender.

In the following, an embodiment is presented in order to provide a thorough understanding of the invention, in which example a received AIS signal is simulated, and then compared to a constructed signal of the present invention.

First, a bit stream is created, consisting of the fields "Preamble" and "Start flag", above, and the random bits corresponding to the rest of the AIS message. In total, the bit stream comprises 250 bits, which may then form the basis for a simulation of a sending of an AIS message with bit rate 9600 bits/sec.

Figure 7A:
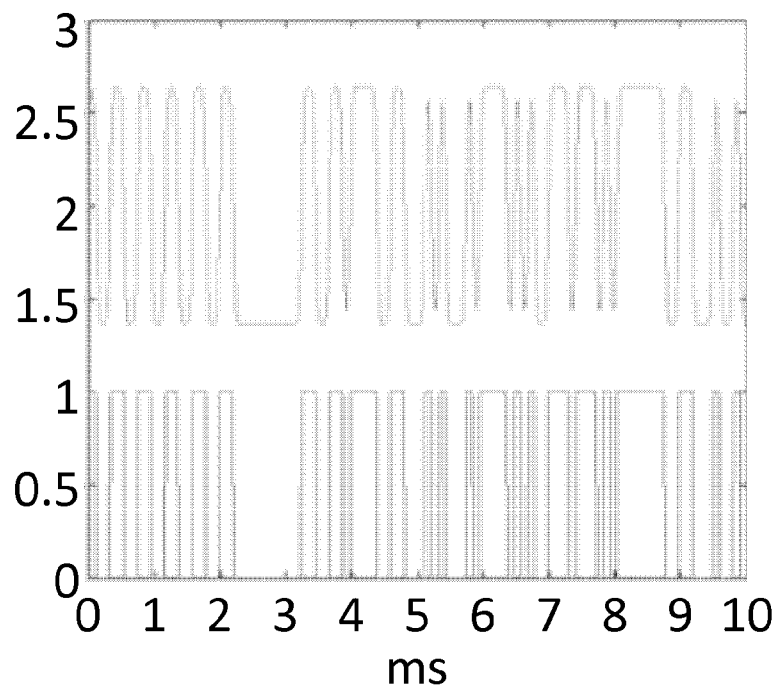
FIGS. 7a-7d are respective graphs illustrating a signal processing in accordance with the invention.

The digital bit stream is graphically illustrated in the lower curve of FIG. 7*a*. The bit stream then passes to a conventional digital gauss filter, resulting in the upper curve of FIG. 7*a*.

Figure 7B:
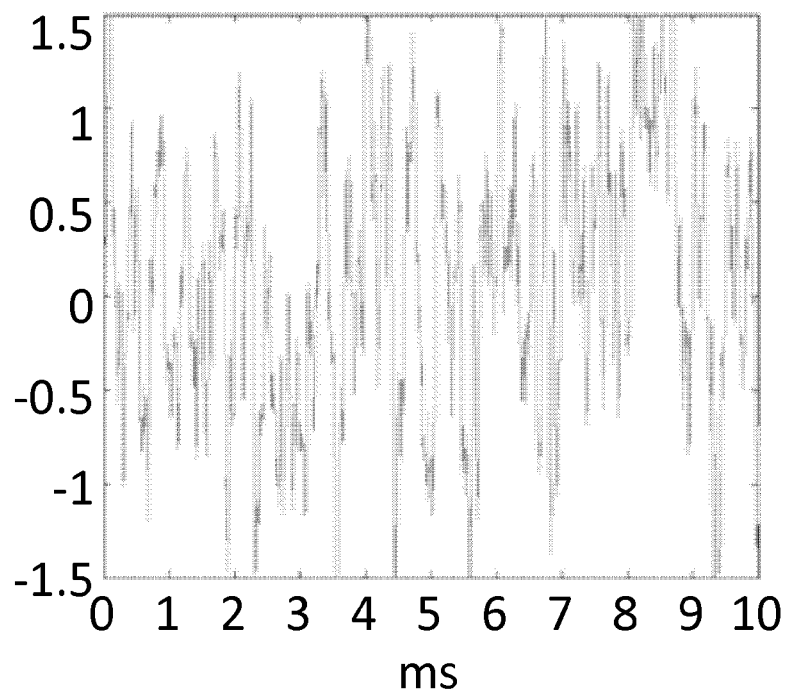

To simulate the interference of the signal arising under normal operating conditions in reality, the resulting signal is then degraded using two consecutive first-order low-pass filters with cut-off frequencies around 5 kHz, arranged to simulate the transmitter's signal characteristics. Finally, a white noise is added, with the same root mean square as the signal itself. The resulting curve is illustrated in FIG. 7*b*.

A simulated sampling, with a sampling rate of 192 kHz, is then carried out, wherein a sampled signal according to the invention is achieved.

A comparison signal is constructed by the upper curve in FIG. 7*a* being subjected to the same low pass filter as the simulated signal, but without white noise.

Next, the sampled and the constructed signals are correlated for different values of a time variable that displace them on the time scale relative to each other. The calculated correlation function of the time variable is illustrated in FIG. 7*c*.

Figure 7C:
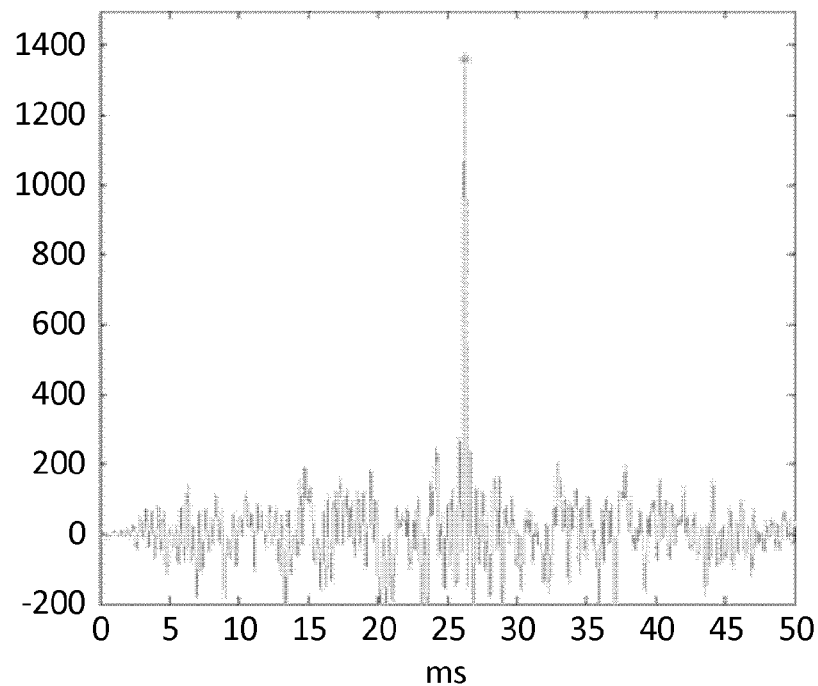
Figure 7D:
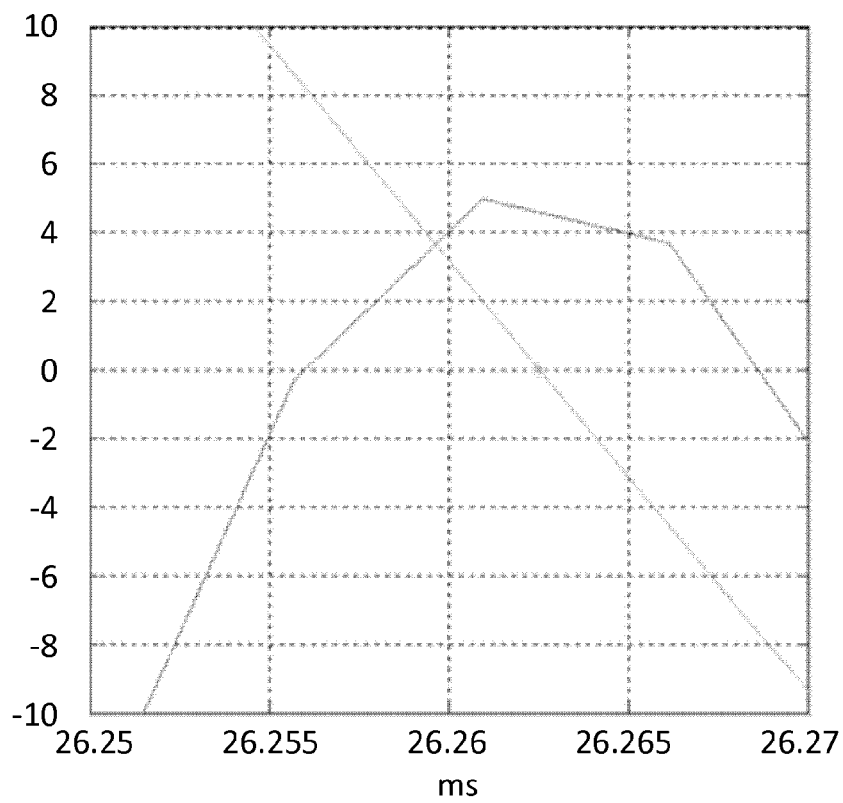

FIG. 7D is an enlargement of the curve 701 shown in FIG. 7*c* around the global maximum of the curve. In FIG. 7*d*, both the actual curve 701 and its derivative 702 are shown. The y-axis indicates the value of the derivative. As is evident in FIG. 7d, the optimum time variable 700 is selected as the value 703 that maximizes the correlation 701, and which is finally calculated by linear interpolation of the derivative function 702.

Such a simulation of real conditions gives the following repeatability regarding the timing for different relative noise levels:
Signal level=Noise level: about 90% fall within ±5.00 μs
Signal level=10×Noise level: about 90% fall within ±0.50 μs
Signal level=100×Noise level: about 90% fall within ±0.05 μs Above, preferred embodiments have been described. However, it is apparent to the person skilled in the art that many modifications can be made to the described embodiments without departing from the basic idea of the invention.

For example, the inventive concept is also applicable to other types of radio messages than AIS messages.

Furthermore, other types of previously known or detected fingerprints regarding the transmitter's signal characteristics may be used to increase security.

Thus, the invention is not to be limited to the embodiments described, but can be varied within the scope of the enclosed claims.

The invention claimed is:

1. A method for determining a time of receipt of a binary coded Automatic Identification System (AIS) message by a radio receiver comprising:
   receiving, by the radio receiver, the binary coded AIS message sent by a sender via a first modulated radio signal, wherein the first modulated radio signal is received by the radio receiver using an antenna so that a second analogue electrical signal is produced;
   sampling the second analogue electrical signal using an analogue-to-digital (AD) converter;
   generating, based on the sampling of the second analogue electrical signal, a third digital signal;
   demodulating either the second analogue electrical signal or the third digital signal;
   determining, from the third digital signal, a data content of the binary coded AIS message as a stream of data bits, the stream of data bits comprising a predetermined signal element;
   determining a time of receipt of the predetermined signal element;
   generating a digitally stored, constructed comparison signal based on said stream of data bits, wherein the constructed comparison signal is constructed to correspond to the third digital signal;
   determining an optimum value for a time variable, wherein the time variable indicates a time position of the constructed comparison signal relative to the third digital signal, and wherein, for the optimum value, a correlation between the constructed comparison signal and the third digital signal is maximal;
   correcting the determination of the time of receipt of the predetermined signal element using the optimum value of the time variable; and
   using the corrected determination of the time of receipt of the predetermined signal element as the time of receipt of the binary coded AIS message.

2. The method according to claim 1, wherein the generating the third digital signal comprises analogue modulation of the second analogue electrical signal, followed by sampling of the resulting second analogously modulated electrical signal.

3. The method according to claim 1, wherein the first modulated radio signal, before modulation by the sender, is filtered using a certain filter, and wherein the constructed comparison signal is constructed by filtering a digital signal representing the data content of the binary coded AIS message using a filter with essentially same properties as the certain filter.

4. The method according to claim 1, wherein the constructed comparison signal, before calculation of the correlation between the constructed comparison signal and the third digital signal, is filtered using a filter so that deviations of the third digital signal, arising as a consequence of an analogue frequency and/or phase response of the radio receiver before sampling are simulated using said filter.

5. The method according to claim 1, wherein the AD converter sends out at least one interrupt signal for marking a certain sampling time point, wherein a time of emission of such interrupt signal is determined using a clock in the radio receiver, and wherein the time determination of the receipt of the predetermined signal element is based upon a timed sending out of the interrupt signal by relating the sending out of the interrupt signal to a certain time position of the third digital signal.

6. The method according to claim 5,
   wherein the AD converter sends out a number of interrupt signals at predetermined time intervals,
   wherein times of sending out of several such respective interrupt signals are determined using the clock and are adjusted using the predetermined time intervals in order to estimate a point in time of a sending out of a certain interrupt signal,
   wherein the adjusted timing determinations are averaged so that an averaged timing determination of the sending out of the certain interrupt signal is achieved, and
   wherein the timing determination of the receipt of the predetermined signal element is based upon the averaged timing determination of the sending out of the certain interrupt signal by relating the certain interrupt signal to a certain time position of the sampled second analogue electrical signal.

7. The method according to claim 5, wherein the clock comprises a local oscillator, which regularly is synchronized to time information in a received Global Positioning System (GPS) signal.

8. The method according to claim 1, wherein a location of the sender is known by the radio receiver, and wherein a common point in time is synchronized between the sender and the radio receiver by the radio receiver correcting the timing determination of the receipt of the predetermined signal element for a time it takes for the first modulated radio signal to travel between the sender and the radio receiver, based upon a distance between respective locations of the sender and the radio receiver.

9. The method according to claim 7, wherein at least three receivers, respective clocks of which have been previously synchronized, receive one and the same first modulated radio signal from the sender, wherein each of the receivers determine the timing of the receipt of the same predetermined signal element of the received first modulated signal, and wherein a location of the sender is determined by triangulation by a central unit in communication with said at least three receivers, based upon a respective location of the three receivers in combination with differences in a respective point in time for the respective receipt of the signal element.

10. The method according to claim 9, wherein the triangulated location for the sender, and/or a heading and/or a velocity which has been calculated based upon several consecutive calculations of the location of the sender, is compared to a location and/or a heading and/or a velocity for the sender which is stated in the binary coded AIS message which is sent out from the sender, and wherein a warning signal is emitted in case the two locations and/or headings and/or velocities are pairwise different by more than a respective predetermined value.

11. A device for determining a time of receipt of a binary coded Automatic Identification System (AIS) message comprising:
a radio receiver including an antenna, an analogue-to-digital (AD) converter, a memory, and a processor, wherein the antenna receives the binary coded AIS message via a first modulated radio signal, and wherein the processor controls the device to:
generate a second analogue electrical signal from the received first modulated radio signal;
sample, using the AD converter, the second analogue electrical signal;
generate a third digital signal from the sampled second analogue electrical signal;
demodulate either the second analogue electrical signal or the third digital signal;
decode the third digital signal to generate a data content of the binary coded AIS message as a stream of data bits, the stream of data bits comprising a predetermined signal element;
determine a time of receipt of the predetermined signal element;
generate a digitally stored, constructed comparison signal based on said stream of data bits, wherein the constructed comparison signal is constructed to correspond to the third digital signal;
determine an optimum value for a time variable, wherein the time variable indicates a time position of the constructed comparison signal relative to the third digital signal, and wherein, for the optimum value, a correlation between the constructed comparison signal and the third digital signal is maximal;
correct the determination of the time of receipt of the predetermined signal element using the optimum value of the time variable; and
use the corrected determination of the time of receipt of the predetermined signal element as the time of receipt of the binary coded AIS message.

12. A system for determining a location of a sender emitting a binary coded Automatic Identification System (AIS) message comprising:
at least three receiving devices, wherein at least one of the three receiving devices comprises an antenna, an analogue-to-digital (AD) converter, a memory, and a processor, wherein the antenna receives the binary coded AIS message via a first modulated radio signal, and wherein the processor controls the at least one receiving device to:
generate a second analogue electrical signal from the received first modulated radio signal;
sample, using the AD converter, the second analogue electrical signal;
generate a third digital signal from the sampled second analogue electrical signal;
demodulate either the second analogue electrical signal or the third digital signal;
decode the third digital signal to generate a data content of the binary coded AIS message as a stream of data bits, the stream of data bits comprising a predetermined signal element;
determine a time of receipt of the predetermined signal element;
generate a digitally stored, constructed comparison signal based on said stream of data bits, wherein the constructed comparison signal is constructed to correspond to the third digital signal;
determine an optimum value for a time variable, wherein the time variable indicates a time position of the constructed comparison signal relative to the third digital signal, and wherein, for the optimum value, a correlation between the constructed comparison signal and the third digital signal is maximal;
correct the determination of the time of receipt of the predetermined signal element using the optimum value of the time variable; and
use the corrected determination of the time of receipt of the predetermined signal element as a time of receipt of the binary coded AIS message.

13. The system of claim 12, wherein each of the at least 3 receiving devices comprises a respective clock,
wherein the AD converter sends out at least one interrupt signal for marking a certain sampling time point,
wherein a time of emission of such interrupt signal is determined using the clock in the at least one receiving device, and
wherein the time determination of the receipt of the predetermined signal element is based upon a timed sending out of the interrupt signal by relating the sending out of the interrupt signal to a certain time position of the third digital signal.

14. The system according to claim 13, wherein the clock of each of the at least 3 receiving devices comprises a local oscillator, which regularly is synchronized to time information in a received Global Positioning System (GPS) signal.

15. The system of claim 14, wherein the respective clocks of the at least three receiving devices have been previously synchronized, and receive one and the same first modulated radio signal from the sender,
wherein each of the receiving devices determine the timing of the receipt of the same predetermined signal element of the received first modulated radio signal, and
wherein the location of the sender is determined by triangulation by a central unit in communication with said at least three receiving devices, based upon a respective location of the three receiving devices in combination with differences in a respective point in time for the respective receipt of the signal element.

* * * * *